United States Patent [19]

Braschel et al.

[11] Patent Number: 4,923,255

[45] Date of Patent: May 8, 1990

[54] METHOD OF CONTROLLING THE BRAKE PRESSURE IN AN ANTI-LOCK VEHICLE BRAKE SYSTEM

[75] Inventors: Volker Braschel, Neuwied; Hubert Schmitt, Ochtendong; Dieter Roller, Neuwied, all of Fed. Rep. of Germany

[73] Assignee: Lucas Industries public limited company, Birmingham, England

[21] Appl. No.: 338,263

[22] Filed: Apr. 14, 1989

[30] Foreign Application Priority Data

Apr. 18, 1988 [DE] Fed. Rep. of Germany ....... 3812903

[51] Int. Cl.[5] .................. B60T 8/32; G05D 13/00; G05D 15/01
[52] U.S. Cl. .................. 303/97; 188/181 A; 188/181 C; 303/100; 303/105
[58] Field of Search ............ 303/91, 100, 95, 96, 303/97, 98, 99, 102, 103, 104, 105, 106, 108, 109, 107; 364/426.02; 188/181 A, 181 C, 181 R

[56] References Cited

U.S. PATENT DOCUMENTS

| | | | |
|---|---|---|---|
| 3,832,011 | 8/1974 | Marouby | 303/97 X |
| 4,193,642 | 3/1980 | Miller | 303/97 |
| 4,485,445 | 11/1984 | Braschel | 303/96 X |
| 4,733,920 | 3/1988 | Pannbacker | 303/97 X |
| 4,763,960 | 8/1988 | Uchida et al. | 303/97 |

FOREIGN PATENT DOCUMENTS

| | | |
|---|---|---|
| 2264141 | 7/1973 | Fed. Rep. of Germany . |
| 2136440 | 4/1981 | Fed. Rep. of Germany . |
| 3201929 | 8/1983 | Fed. Rep. of Germany . |

OTHER PUBLICATIONS

Bosch Technische Berichte-English Special Edition (Feb. 1982), Technical and Scientific Report 1 concerning R&D, and Production in the Bosch Group-pp. 65-93 and copy in German.

Primary Examiner—Douglas C. Butler
Attorney, Agent, or Firm—Scrivener and Clarke

[57] ABSTRACT

A method of controlling the brake pressure in an antilock (ABS) vehicle brake system provides for adapting the wheel at which the brake is applied to the optimum course of the coefficient of friction/slip curve by determining the rotational retardation of the braked wheel, upon initiation of a braking action, after given time intervals each and comparing it with the rotational retardation of the preceding time interval. Moreover, the brake pressure is varied in response to the result of the comparison. The renewed acceleration of the retarded wheel also is monitored accordingly so as to effect further lowering of the brake pressure if the renewed acceleration or the gain in acceleration is too small.

6 Claims, 2 Drawing Sheets

METHOD OF CONTROLLING THE BRAKE PRESSURE IN AN ANTI-LOCK VEHICLE BRAKE SYSTEM

The invention relates to a method of controlling the brake pressure in an anti-lock (ABS) vehicle brake system, wherein the rotational behavior of a braked wheel is measured and the brake pressure is changed if the wheel slip and/or rotational deceleration should exceed predetermined threshold values.

In the case of conventional vehicle brakes furnished with an anti-lock system the rotation of the individual wheels of the vehicle is monitored constantly and particularly the slip of the braked wheels and their retardation are determined in order to detect a tendency of the wheel to become locked and prevent such locking. The further rise of pressure in the brake of the wheel concerned is terminated or the brake pressure reduced as soon as the wheel slip or retardation indicate a locking tendency, a circumstance which is ascertained by the fact that certain predetermined threshold values relating to slip and/or retardation are surpassed.

The fundamental principles of the structure and function of anti-lock vehicle brake systems may be assumed to be known and have been described, for instance, in BOSCH TECHNISCHE BERICHTE, vol. 7, 1980, no. 2, pages 65 to 94 (correspondingly in Bosch Technological Reports, English special edition, Feb. 1982, ISSN 0006-789 X)

The question with the anti-lock brake pressure control mainly is to keep the circumferential speed of the braked wheels as best as possible in the most favorable range of the known adherence coefficient/slip curve during all the control cycles of a braking action.

The anti-lock system should be able to react most sensitively and without delay to a change in the rotational behavior of the braked wheel indicating a tendency of the wheel to become locked in order that braking at the shortest possible stopping distance can be achieved while the vehicle remains steerable.

To accomplish that, the prior art provides for setting the threshold values as closely (sensitively) as possible at which values a change takes place in the course of the brake pressure (pressure reduction, pressure maintenance, or pressure increase). However, in that case there are certain limits, due to various reasons, to such sensitive adjustment of the threshold values.

The decisive factor for the shortest possible stopping distance, at simultaneous steering stability of the vehicle, to be achieved upon a braking action is the coefficient of adherence $\mu$ between the road surface and the tire of the wheel at which the brake is applied. For this reason the coefficient of adherence often is referred to in publications as the "brake pressure coefficient". The coefficient of adherence $\mu$, as a function of slip, depends among many parameters, such as especially the construction and profile as well as the contact force of the tire and the tire pressure, quite essentially on the property of the surface of the roadway (whether dry, wet, or icy).

In the coefficient of friction/slip curve which, as a rule, takes a characteristic course usually a distinction is made (cf. publication cited above) between so-called "stability ranges" and "instability ranges". When the braked wheel is running on the rising branch of the brake pressure coefficient/slip curve it is "stable" and has good lateral guidance, whereas it is "unstable" and has poor lateral guidance while running on the descending branch of the brake pressure coefficient/slip curve. It takes a very strong reduction of the brake moment (pressure decrease) to return the wheel from the unstable into the stable state.

Consequently, the retarded wheels must be kept in the stable range, yet close to the transition into instability if the shortest possible stopping distance is to be obtained and yet the vehicle is to be well steerable.

To achieve such adaptation, the prior art provides for a first phase of lowering the pressure (when certain threshold values relating to slip and/or rotational retardation of the braked wheel are exceeded) to be followed by a second phase during which the brake pressure is maintained unchanged. The brake pressure is reduced further if the rotational retardation of the wheel or the slip determined after this second phase still is too high. Both the duration of the pressure reduction phase and the duration of the subsequent holding phase may be made dependent on the rotational retardation of the wheel measured.

At a great number of conditions, the methods known in the art have the disadvantage that the pressure reduction is terminated too late. This means that so-called underbraking occurs at which stopping distance is given away. On the other hand, the pressure reduction also may be completed too soon and that again has the consequence of unnecessarily long phases occurring upon braking during which the wheel does not turn in the optimum range of the coefficient of friction/slip curve.

An ABS control method is known from DE-22 64 141 C2 with which the time axis is incremented. In that case the wheel retardation is determined during periods of constant brake pressure and it is ascertained whether the wheel retardation decreases (or remains constant) or whether the wheel retardation increases. The brake pressure control is effected in consideration of whether the wheel retardation detected is decreasing or increasing. With these known methods the comparison of the wheel retardations is absolute, i.e. the determination as to whether the wheel retardation decreases or increases relates exclusively to the sign of the deceleration of the wheel, i.e. to ascertaining whether the wheel is decelerated or accelerated. No comparison is made between wheel retardations (or accelerations) during successive time intervals. With this known state of the art, if the wheel retardation diminishes in a brake pressure phase during which the pressure is constant, the braked wheel is in the stable range of the coefficient of friction/slip curve. On the other hand, if the wheel retardation increases at constant brake pressure, it is concluded that the wheel is in the unstable range of the coefficient of friction/slip curve so that the brake pressure must be lowered. This means that with this known ABS control system a comparison is made exclusively between measuring magnitudes which are measured when there is a constant brake pressure. Changes in the rotational movement of the wheel from one time interval to the next one are not compared either, instead the only comparison made is between measured values and absolute values.

It is, therefore, an object of the invention to devise a method of controlling the brake pressure in an anti-lock vehicle brake system with which the braked wheel remains as closely as possible to the optimum value of the coefficient of friction/slip curve.

This object is met, in accordance with the invention, in that, upon initiating a braking action, the rotational retardation of the braked wheel is determined, after given time intervals each, and is compared with the rotational retardation measured during the preceding time interval and the change in brake pressure is effected in response to the result of the comparison.

While the state of the art provides for variation of the course of the brake pressure throughout all the control cycles of a braking action in consideration of whether the braked wheel exceeds certain threshold values, the invention thus follows a totally different path. Once brake actuation has begun the total course of time is divided into short time intervals of some 3 to 20 milliseconds (ms). Time intervals of 5 to 10 ms are preferred. Then the rotational deceleration and/or the rotational acceleration is determined and compared with that from the preceding time interval. The brake pressure in accordance with the invention now is controlled in response to the result of the comparison instead of the surpassing of certain threshold values (as with the prior art).

According to the invention, thus the time axis is incremented, and the values measured in respect of the rotational behavior in two contiguous time intervals each (of course disregarding the first time interval) are resorted to as control parameters for the brake pressure. In other words the gradient of the course of the rotational velocity of the wheel above time is drawn upon as the decisive control magnitude of the brake pressure.

Incrementing the time axis in an anti-lock system is known from DE-OS No. 32 01 929 in which case, however, it serves different purposes.

In a preferred modification of the invention it is provided to lower the brake pressure at least for part of the coming time interval if the comparison shows that the rotational deceleration during the last concluded time interval diminished less than a given value as compared to that of the preceding time interval.

In mathematical terms, according to the invention the differential quotient of the retardation above time is formed. It is also possible to realize the method according to the invention such that, purely mathematically, the differential quotient is formed and its variation observed. The procedure according to the invention has an extremely short "relaxation time", in other words, as compared to conventional controls, the ABS system reacts extremely fast to changes in the roadway condition. With conventional control systems such rapid variation is undesired for various reasons and, therefore, eliminated by filtering. With the method according to the invention on the other hand a variation of the control state within a few milliseconds is possible and desired, too.

A preferred modification of the method according to the invention provides for forcing the wheel into a favorable range of the coefficient of friction/slip curve at the beginning of a braking action by setting threshold values in respect of slip and/or retardation of the braked wheel in conventional manner (e.g. a threshold value of 1.5 g regarding deceleration and a threshold value of 20% regarding slip) for a predetermined time period as of the beginning of a braking action, this time period being longer than the time interval of incrementing provided in accordance with the invention. These threshold values first must be exceeded before control according to the invention sets in with predetermined time intervals and a comparison of the rotational retardations from time interval to time interval.

To avoid underbraking of an unstable wheel, it is provided with another modification of the invention that the lowering of the brake pressure is terminated if the comparison shows that the rotational retardation in the last concluded time interval has diminished more than a predetermined value as compared to that of the preceding time interval. Also the renewed acceleration phase of the wheel is monitored which takes place after a pressure reduction in order thus to bring back a wheel which has become unstable into the stable range of the coefficient of friction/slip curve as quickly as possible. To accomplish that, it is provided to determine the rotational acceleration of the braked wheel, after predetermined time intervals each, upon initiation of a braking action and to compare it with the rotational acceleration measured during at least one preceding time interval, and to vary the brake pressure in response to the result of the comparison.

Thus, if the absolute value of the renewed acceleration of the wheel is too small or if no increase can be seen in the re-acceleration, the brake pressure is continued to be lowered even if the wheel already is picking up speed again. In this manner it will get more rapidly into the optimum range of the coefficient of friction/slip curve.

In accordance with a preferred modification of the invention such reduction of the brake pressure in the phase of renewed acceleration is effected only if the wheel still is in slipping state. For this reason the slip of the braked wheel is monitored permanently and it is determined whether or not it is greater than a predetermined value.

If the pressure were reduced further regarding a wheel during its phase of renewed acceleration when the wheel no longer is in a state of sufficient slip, this would cause an additional pressure reduction even if the wheel already is beginning to become stable because, of course, the renewed acceleration becomes less upon transition into the range of stability.

There also are, however, road surfaces having a relatively low coefficient of friction on which surfaces the reacceleration of the wheel becomes less again at a high slip of the wheel already. In this event there is a risk that the ABS control system too soon will indicate that a wheel presumably is turning stably again and thus switch over to pressure build-up although the slip still is high. That may result in an undesirable early locking of the wheels. To avoid that, there should be a possibility of effecting a reduction of the brake pressure under certain circumstances even during a phase of renewed acceleration of the wheel if no slip is detected when the reference velocity is calculated too low although, in fact, the wheel still is in a state of slip.

The "certain" circumstances mentioned above under which a pressure reduction is provided in a re-acceleration phase although the computer does not calculate any slip particularly are the following:

1) if the wheel becomes unstable again after short periods of pressure raising, 2) if the lowering of pressure continued for quite some time (e.g. 50 ms), and 3) if no high absolute values of acceleration (e.g. 5 g) occur during the phase of renewed acceleration.

Preferred modifications of the invention, therefore, provide that the entire pressure build-up time period be measured during an acceleration phase of the braked wheel and, if that time period proves to be shorter than a given value, the brake pressure is lowered even if no slip is detected in respect of the wheel.

In accordance with another preferred modification of the method according to the invention the time period is measured during which the braked wheel moves in the unstable range of the coefficient of friction/slip curve while it is being accelerated. Likewise measured is the respective time period during which the wheel moves in the stable range of the coefficient of friction/slip curve. These values can be stored continuously by the computer of the ABS control system. During an acceleration phase the time period of instability of the wheel then is compared with the preceding time period of stability of the wheel, and a relationship is established between both time periods (the quotient is formed of the time periods). If the quotient is greater than a predetermined value (e.g. being 1) a subsequent lowering of pressure takes place even if no slip is determined in respect of the wheel.

Furthermore, preferably the entire pressure reduction time period is measured during an acceleration phase of the braked wheel and, if this period proves to be longer than a predetermined value, the lowering of the brake pressure is effected even if no slip is determined regarding the wheel.

Finally, also measurement of the respective absolute values of acceleration may be provided at the given time intervals during a phase of acceleration of the braked wheel. These values then are compared with a given value of acceleration and, if all the acceleration values measured are smaller than the predetermined value of acceleration, the brake pressure reduction is carried out even if no slip is determined with respect to the wheel.

An embodiment of the invention will be described further below with reference to the accompanying drawing in which:

FIG. 1a shows the course of the circumferential speed $V_{Rad}$, the reference speed $V_{Ref}$ and vehicle speed $V_{Fz}$;

FIG. 1b shows the valve positions corresponding to the speeds of FIG. 1a;

FIG. 1c shows the course of the brake pressure corresponding to the speeds and valve positions of FIGS. 1a and 1b; all of FIGS. 1a, 1b and 1c being illustrated, for the purposes of convenience and clarity, with respect to a common time scale t.

Figure 1:
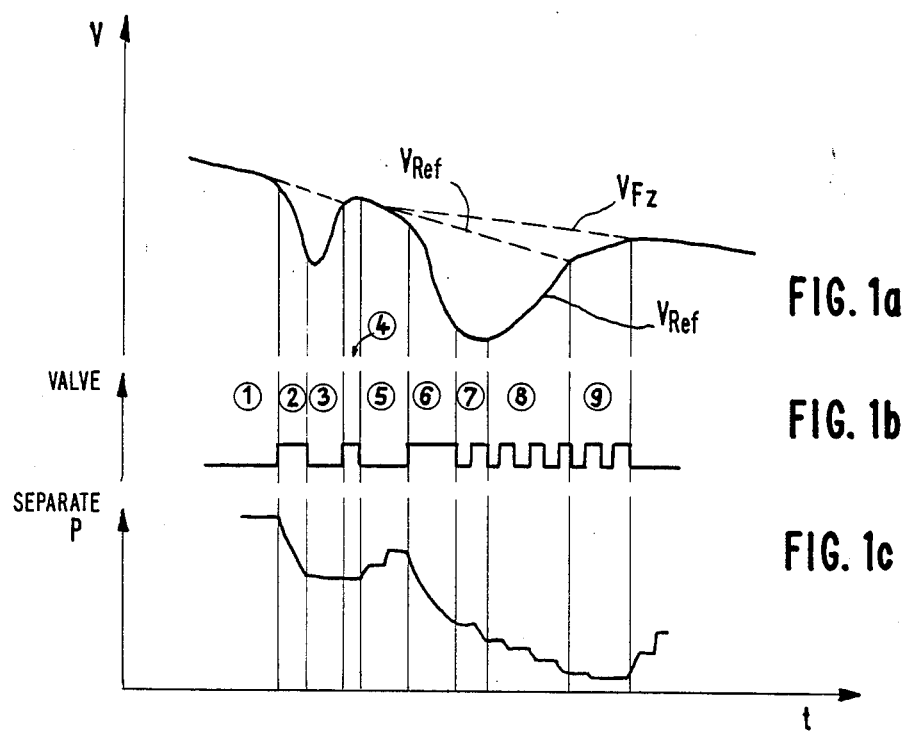

In FIG. 1 different phases are designated 1, 2... and 9. In phases 1 and 5 the braked wheel runs in stable state as explained above, i.e. in the optimum range of the coefficient of friction/slip curve.

During phases 2 and 6 a closed pressure reduction takes place (i.e. not a pulsed lowering of pressure but a permanent one) since the decrease of the deceleration from time interval to time interval (of 10 ms each) is permanently less than a given value of, for instance, 1 g/5 ms.

During phase 3. the renewed acceleration of the wheel is greater than a given absolute value and it also increases sufficiently from time interval to time interval so that no further pressure reduction is initiated. Therefore, as shown in FIG. 1b), the curve is in the lower basic state and that means that the pressure reduction valve is closed. An open pressure reduction valve is illustrated by the step in FIG. 1b).

During phase 4, although the re-acceleration is less, there still is no sufficient slip so that the pressure is not lowered.

During phase 7 the decrease of the rotational retardation of the wheel from time interval to time interval is too small so that pulsed pressure reduction is effected.

During phase 8 the acceleration of the wheel is too small, more specifically, the increase in acceleration, i.e. the change of the rotational velocity from time interval to time interval is less than a given value so that pulsed pressure reduction continues in order to bring the rotational speed $v_{Rad}$ of the wheel more rapidly into the range of the reference speed $v_{Ref}$.

During phase 9 the computer determines that the following conditions are fullfilled:

1) The lowering of pressure is taking place for quite some time already, namely longer than a predetermined value of e.g. 50 ms. This means that phases 6, 7, and 8 together last longer than 50 ms.

2) The wheel had become unstable again after a short period of raising of the pressure, i.e. phase 5 was shorter than phases 6, 7, and 8 together.

3) And the renewed acceleration in the directly preceding phase 8 was less than a predetermined value of e.g. 5 g.

Further pressure reduction takes place in phase 9 because all of the three conditions mentioned above are fullfilled.

Figure 2:
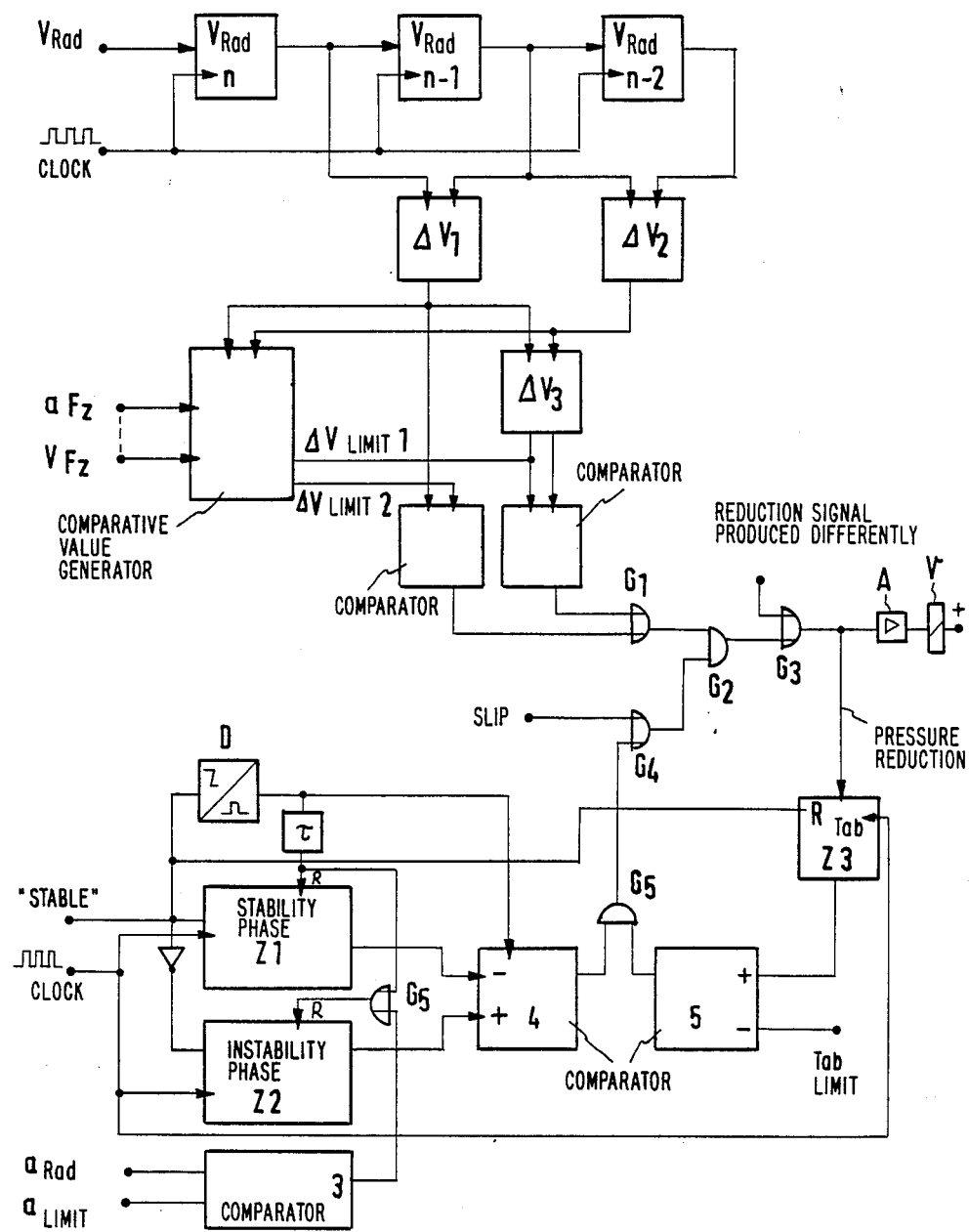
FIG. 2 is a block diagram showing a circuit for carrying out a method according to the invention.

FIG. 2 is a block diagram showing a circuit for carrying out the procedure specified above.

One calculating run corresponds to each time interval mentioned of, for example, 10 ms. In each calculating run the wheel circumference speeds are memorized (as shown at the top of FIG. 2). For interval n this is the wheel circumference speed $v_{Radn}$, for interval n−1 this is the wheel circumference speed $v_{Radn-1}$, and for the instantaneous time interval it is the wheel circumference speed $v_{Radn-2}$. At the outputs of functional blocks $\Delta v_1$ and $\Delta v_2$ thus the speed differences are available between two successive time intervals. As the run or clock of e.g. 10 ms is a fixed predetermined magnitude, the speed difference also provides a direct measure of the acceleration or decelerations of the braked wheel.

The change in acceleration or deceleration thus can be read at the output of the difference forming circuit $\Delta v_3$.

In case of wheel circumference retardations which are greater than a given limit value $\Delta v_{limit2}$ or accelerations which are smaller than this threshold a signal "1" will appear at the output of comparator 1. If the decrease in retardation (or the increase in acceleration) is less than predetermined by $\Delta v_{limit2}$ the output of comparator 2 likewise will be a signal "1". The values of $\Delta v_{limit1}$ and $\Delta v_{limit2}$ are produced in a comparative value generator and depend on whether the wheel is slowing down or picking up speed. Moreover, these values may be made dependent on the vehicle speed $v_{Fz}$ and the vehicle deceleration $a_{Fz}$. The dependencies are determined experimentally by a person skilled in the art for the respective vehicle.

The output signals of comparators 1 and 2 are linked by OR gate G1 and control amplifier A and thus pressure reduction valve V through gate G3 if a signal "1" is applied also to the second input of gate G2. This signal "1" is provided if there is a signal at the first input of gate G4 in case of sufficient slip or if there is a signal "1" at the output of gate G5. To provide such a signal "1", the following conditions must be fullfilled:

As long as the braked wheel is turning in unstable state (as results, in per se known manner, from the slip of the wheel) a counter Z2 is counted up at a fixed time clock. On the other hand, if the wheel is turning in the stable range, a counter Z1 is counted up at a fixed time clock. Upon transition from the stable into the unstable range differentiator D generates a pulse and the counts of both the counters are entered into comparator 4. After a certain delay both counters are cleared and thus are ready for further measurements to be taken. A signal "1" does not appear at the output of the comparator unless the instability phase was longer than the stability phase. At high wheel circumference accelerations, i.e. $a_{Rad} > a_{limit}$ comparator 3 supplies a signal "1" which clears counter Z2 through gate G6. As a result, the time of instability accumulated until then at high re-acceleration values will be cancelled and the time period of stability usually will be greater as a consequence. In other words, a signal "0" appears at the output of comparator 4. Yet if there is a signal "1" at the output and if comparator 5 likewise furnishes a signal "1" because the pressure reduction time determined in counter Z3 already is greater than a given comparative value $tab_{limit}$, there will be a signal "1" also at the output of gate G5 and the pressure reduction signals controlled by the output of gate G1 will become effective without any slip being computed in respect of the wheel at which the brake is applied.

What is claimed is:

1. A method of controlling the brake pressure in an anti-lock vehicle brake system, wherein the rotational behavior of a braked wheel is measured and the brake pressure is changed in response to the same, characterized in that upon initiating a braking action the rotational retardation of the braked wheel is determined, after predetermined time intervals each, and is compared with the rotational retardation measured during the preceding time interval, in that the brake pressure is lowered at least during part of the next successive time interval if the comparison shows that the rotational retardation during the last concluded time interval diminished less than a predetermined value as compared to that of the preceding time interval, and in that the lowering of the brake pressure is terminated if the comparison shows that the rotational retardation during the last concluded time interval diminished more than a predetermined value as compared to that of the preceding time interval.

2. A method of controlling the brake pressure in an anti-lock vehicle brake system, wherein the rotational behavior of a braked wheel is measured and the brake pressure is changed in response to the same, characterized in that upon initiating a braking action the rotational acceleration of the braked wheel is determined, after predetermined time intervals each, and is compared with the rotational acceleration measured during at least one preceding time interval, and in that the brake pressure is lowered at least during part of the next successive time interval if the comparison shows that the absolute value of the acceleration of the wheel during the last concluded time interval is smaller than a predetermined value and/or differs less than a predetermined value from the acceleration value during the preceding time interval.

3. The method as claimed in claim 1 or 2, characterized in that the lowering of the brake pressure is effected only if the slip of the wheel is greater than a predetermined value.

4. The method as claimed in claim 2, characterized in that the entire pressure build-up time period is measured during an acceleration phase of the braked wheel and, if this time period proves to be shorter than a predetermined value, the lowering of the brake pressure is effected also if no slip is determined for the wheel.

5. The method as claimed in claim 2, characterized in that the time of the instability of the wheel is measured during an acceleration phase of the braked wheel and is compared with the preceding time of stability of the wheel, in that a relationship is established between the time periods thus measured of instability and stability of the wheel, and in that the lowering of the brake pressure is effected also if no slip is determined for the wheel, provided said relationship proves to be greater than a predetermined value.

6. The method as claimed in claim 2, characterized in that the respective absolute values of acceleration are measured during an acceleration phase of the braked wheel in the predetermined time intervals and are compared with a predetermined value of acceleration and, if all the acceleration values measured are smaller than the predetermined value of acceleration, the lowering of the brake pressure is effected also if no slip is determined for the wheel.

* * * * *